July 19, 1960     C. U. VAUGHAN ET AL     2,945,584
POCKET CASE WITH HOLDERS FOR INSTRUMENTS
Filed June 18, 1958     2 Sheets-Sheet 1

Christine U. Vaughan,
Robert E. Bond,
Kenneth A. Milette,
INVENTORS.

BY Robert M. McManigal
Attorney

July 19, 1960 C. U. VAUGHAN ET AL 2,945,584
POCKET CASE WITH HOLDERS FOR INSTRUMENTS
Filed June 18, 1958 2 Sheets-Sheet 2

Christine U. Vaughan,
Robert E. Bond,
Kenneth A. Milette INVENTORS.

BY
Robert M. McManigal
Attorney

United States Patent Office 2,945,584
Patented July 19, 1960

2,945,584

POCKET CASE WITH HOLDERS FOR INSTRUMENTS

Christine U. Vaughan and Robert E. Bond, Pasadena, and Kenneth A. Milette, La Puente, Calif., assignors to V. & E. Manufacturing Co., Pasadena, Calif., a partnership Filed June 18, 1958, Ser. No. 742,904

1 Claim. (Cl. 206—16)

The present invention relates generally to a pocket case for instruments, such as drawing instruments and the like, and is more particularly concerned with improved means for supporting and anchoring the instruments within the case.

One object of the invention is to provide an instrument case of compact construction with improved means for anchoring and retaining the instruments against inadvertent displacement, when the case is in closed position, yet presents the instruments in a readily accessible position for use, when the case is opened.

A further object is to provide in an instrument case, instrument holding pads in which instrument retaining recesses are provided and so constructed that wall portions of the recesses overlie and grip portions of the instruments so as to anchor and retain them against removal inadvertently.

Still another object is to provide in an instrument case novel instrument holding pad portions which are so arranged that the pad portions mutually coact, when the case is closed, to form keepers for retaining the instruments against displacement from their respective supporting pads.

Still another object is to provide in an instrument case an instrument supporting structure which will support the instruments in an elevated position in which end portions of the instrument are readily accessible and may be easily grasped to remove the instrument from the pad support.

Further objects of the invention will be brought out in the following part of the specification, wherein detailed description is for the purpose of fully disclosing the invention without placing limitations thereon.

Referring to the accompanying drawings, which are for illustrative purposes only:

Figure 1:
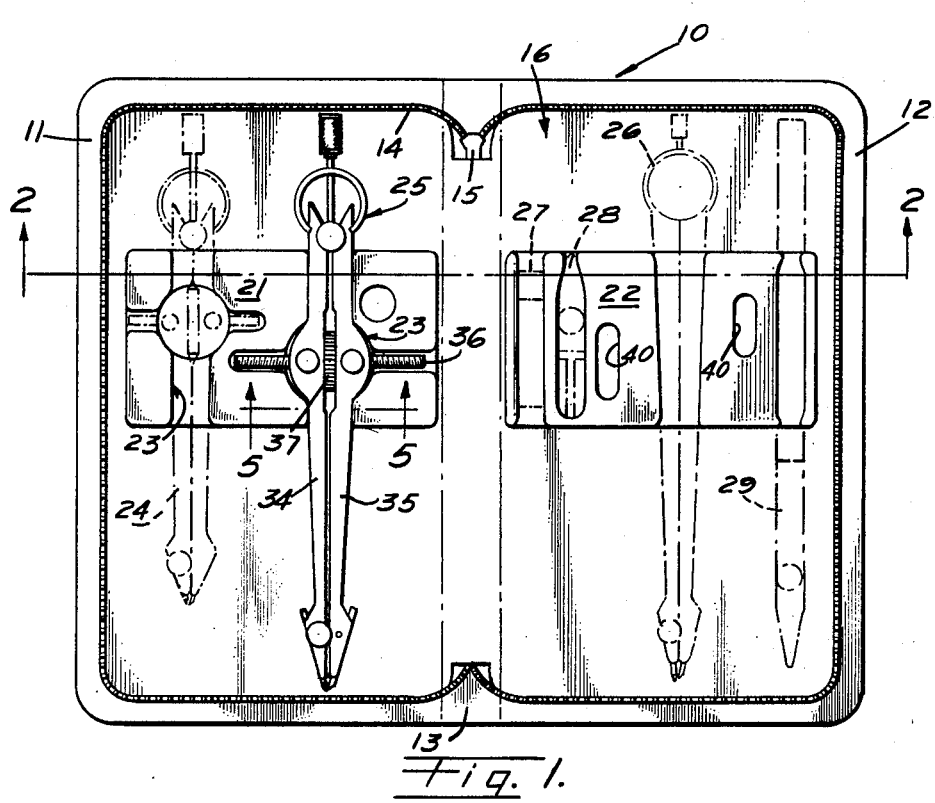
Fig. 1 is a plan view of an instrument case constructed according to the present invention, the case being shown in opened position with the instruments positioned for ready removal as needed.
Figure 3:
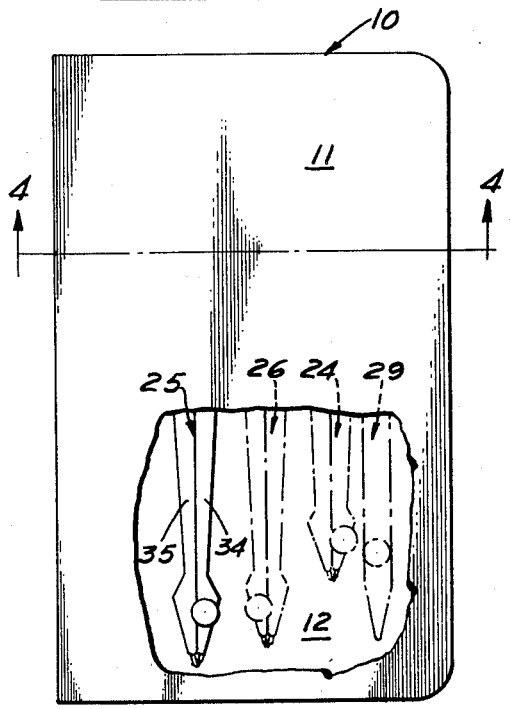
Fig. 3 is a plan view of the instrument case, shown in closed position, and having a part of the case cover removed to show the relationship of the instruments therein.

Referring more specifically to the drawings, the present invention is illustrated as comprising a pocket case of conventional construction, as generally indicated by the numeral 10, the case being composed of wing sections 11 and 12 which extend on opposite sides of a hinged interconnecting portion 13 permitting movement of the wing sections to an opened position as shown in Fig. 1, and to a closed position in which the wings overlie each other as shown in Fig. 3. A "zipper" as indicated by the numeral 14 and an associated slide 15 are provided for retaining the wing sections in closed position. The case as thus far described is in general of conventional construction and may be fabricated from suitable materials such as leather, plastic and the like which embody various finishes and form an attractive appearance.

Figure 2:
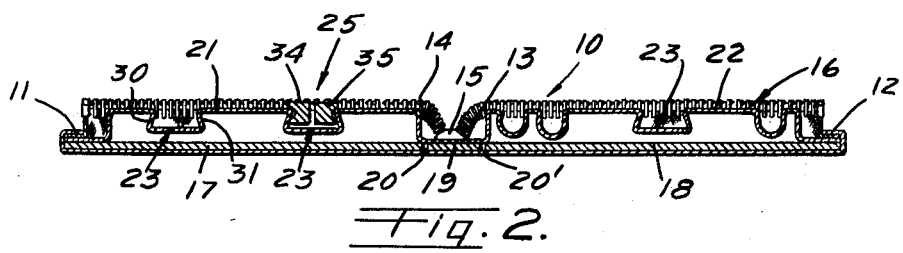
Fig. 2 is a transverse sectional view through the opened case, taken substantially on line 2—2 of Fig. 1.
Figure 4:
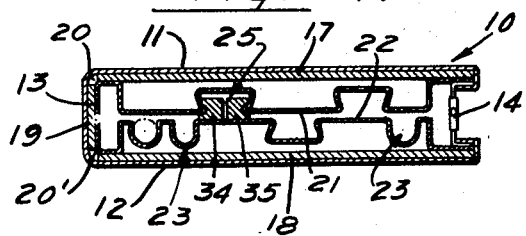
Fig. 4 is a sectional view, taken through the closed case, substantially on line 4—4 of Fig. 3.

As a feature of the present invention, an insert 16 is fabricated from a thin sheet of elastic plastic or other suitable material. This insert forms in effect an inner lining which extends over the wing sections 11 and 12, as well as the interconnecting hinge portion 13. As shown primarily in Figs. 2 and 4, the insert may be stiffened by backing pieces 17, 18 and 19 which may be fabricated from cardboard or other suitable material, and the peripheral outer edges of the insert, the backing pieces and the material forming the case cover may be secured by stitching or otherwise in a conventional manner to form a complete assemblage. The contiguous edges between the backing strips 17 and 19 form a hinge line 20, and the contiguous edges between the backing strips 18 and 19 form a hinge line 20' so as to permit hinged movements of the wing sections.

The insert 16 has portions in the wing sections lying on opposite sides of the interconnection 13, which are formed to provide raised pad areas 21 and 22 respectively. These pads have a plurality of recesses, as generally indicated by the numeral 23 which are generally of a configuration to conform to a part of the instrument which may be seated in the recess. For example, the recesses in Fig. 1 are shown with a small bow compass 24 and a large bow compass 25 as being supported in the pad 21, while the recesses of the pad 22 support a friction divider 26, a container 27 for compass points, a compass pen attachment 28, and a ruling pen 29. While drawing instruments have been described as illustrative of the type of instruments which may be used in the case of the present invention, it is clearly within the concept of the invention that other types of instruments may likewise be used.

Figure 5:
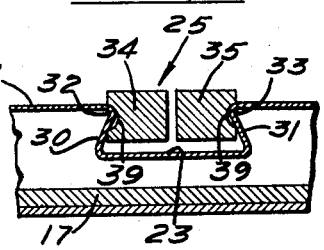
Fig. 5 is an enlarged fragmentary sectional view, showing the manner in which a seated instrument is gripped and anchored, taken substantially on line 5—5 of Fig. 1.

While the general configuration of the recesses may vary, depending upon the particular instrument which is to be seated therein, the recesses have a common characteristic in that the recesses are in the nature of grooves having upwardly converging side walls 30 and 31, as best shown in Fig. 5, to form overhanging groove top edges 32 and 33 which define a more or less restricted entrance opening to the groove. In the case of instruments of circular section, such as the ruling pen 29, the edges 32 and 33 will overlap the upper portions of the pen and thus anchor it in the recess, when the pen is inserted sidewise to a seated position therein.

Figure 6:
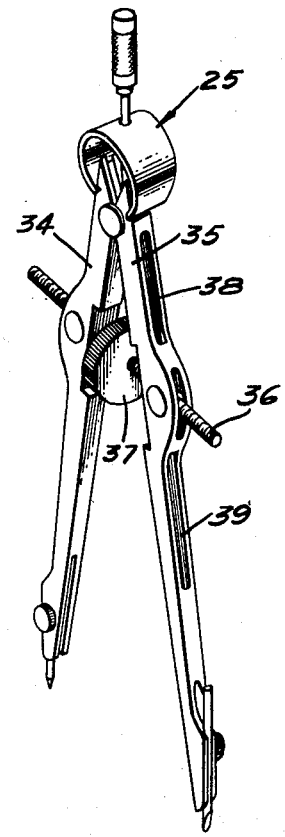
Fig. 6 is a perspective view of an instrument, in this case a bow compass, for more clearly disclosing the details of its construction which adapt it specifically for use in the case of the present invention.

In the case of instruments such as the compasses 24 and 25, and the dividers 26, these instruments are so constructed that edge portions of the groove walls will extend into lateral recesses of the instrument and thus cooperate to anchor the instrument in a seated position in the groove. For example, the bow compass 25, as shown in Fig. 6 has hingedly connected legs 34 and 35 which are adjustably actuated by a center screw 36 which carries an actuating thumb piece 37. The two legs of the compass are similarly constructed and in each case are provided with lateral grooves as shown and indicated by the numerals 38 and 39 respectively. When this compass is seated in a recess, as shown in Fig. 5, edge portions 32 and 33 on one side of the center screw 36 will extend into the lateral grooves 38 of the compass legs, while edge portions of the groove on the other side of the center screw will extend into the lateral grooves 39 of the compass legs. The insert material forming the pad areas is sufficiently yielding to admit the instrument into the groove under the application of slight pressure, and at the same time is sufficiently resilient to recover and grippingly hold the instrument in seated position.

It will be observed that in addition to the instrument receiving recesses or grooves which have been previously described, there are other grooves or recesses, for example, the recess as indicated by the numeral 40 in the pad 22 which is adapted to receive the projecting thumbpiece 37 of the large bow compass 25, when the case is in closed position. Thus the instrument is more firmly held in position and anchored against inadvertent displacement from its seated position in the pad 21.

By utilizing the construction described above, an advantageous feature is obtained in the present invention in that in the closed position of the case, the pads 21 and 22 are moved into overlying relationship and mutually coact to form keepers for retaining the instruments against displacement from their respective seated positions.

Moreover a further advantage will be appreciated in utilizing pads which are of a length less than the length of the instruments, so that the ends of the instruments project beyond the edges of the pad and are retained in an elevated position so that they may be readily grasped and removed from the pad for use.

Various modifications may suggest themselves to those skilled in the art without departing from the spirit of our invention, and, hence, we do not wish to be restricted to the specific form shown or uses mentioned, except to the extent indicated in the appended claim.

We claim:

A case for instruments, such as drawing instruments, which comprises a pair of wing sections extending on opposite sides of a hinged intersection which extends longitudinally of said wing sections and permits movement of the wing sections between an open position and a closed position in which one wing section overlies the other, each of said wing sections having an inner wall and an instrument holding pad comprising an insert member of thin walled resilient sheet material, said pad having an upper surface raised above said inner wall and extending laterally across the wing section, said pad being substantially smaller than said inner wall in a direction longitudinally of said wings and being substantially centered longitudinally of said wings, each of said pads having at least one recess extending from end to end thereof in a direction longitudinally of said wings, the bottom surfaces of said recesses being elevated above said inner wall, said recesses having side walls which taper inwardly and upwardly, the side walls of at least one of said recesses having laterally extending recesses, the recesses in opposite pads being staggered so as to be disaligned when said wings are positioned in overlying relationship, whereby said recesses are adapted to grippingly retain instruments of such length as to protrude substantially beyond both sides of said pad with the protruding ends of the instruments held in elevated positions above said inner walls and said laterally extending recesses accommodate protruding parts of an instrument to anchor it against longitudinal removal.

References Cited in the file of this patent

UNITED STATES PATENTS

| | | |
|---|---|---|
| 1,594,401 | Zeitung | Aug. 3, 1926 |
| 1,666,668 | Purchas | Apr. 17, 1928 |
| 1,939,497 | Herring | Dec. 12, 1933 |
| 2,228,493 | Will | Jan. 14, 1941 |
| 2,811,246 | Sloane | Oct. 29, 1957 |

FOREIGN PATENTS

| | | |
|---|---|---|
| 350,604 | France | June 20, 1905 |